US012325842B2

(12) United States Patent
Gossard et al.

(10) Patent No.: US 12,325,842 B2
(45) Date of Patent: Jun. 10, 2025

(54) DECONTAMINATION PASTE CONSISTING OF CLAYS AND MICROFIBERS AND METHOD FOR DECONTAMINATING A SOLID MATERIAL USING SAID PASTE

(71) Applicant: COMMISSARIAT ÀL'ÉNERGIE ATOMIQUE ET AUX ÉNERGIES ALTERNATIVES, Paris (FR)

(72) Inventors: Alban Gossard, Avignon (FR); Mohamed Nidal Ben Abdelouahab, Bagnols sur Ceze (FR); Philippe Coussot, Ozoir-la-Ferriere (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 682 days.

(21) Appl. No.: 17/298,715

(22) PCT Filed: Dec. 5, 2019

(86) PCT No.: PCT/FR2019/052945
§ 371 (c)(1),
(2) Date: Jun. 1, 2021

(87) PCT Pub. No.: WO2020/115443
PCT Pub. Date: Jun. 11, 2020

(65) Prior Publication Data

US 2022/0049189 A1 Feb. 17, 2022

(30) Foreign Application Priority Data

Dec. 7, 2018 (FR) ...................................... 1872500

(51) Int. Cl.
*C11D 7/14* (2006.01)
*C11D 3/12* (2006.01)

(52) U.S. Cl.
CPC .............. *C11D 3/1253* (2013.01); *C11D 7/14* (2013.01)

(58) Field of Classification Search
CPC . C11D 2111/14; C11D 2111/24; C11D 9/442; C11D 9/444; C11D 9/446; C11D 9/20; C11D 9/262; C11D 7/50; C11D 7/14; C11D 3/33; C11D 3/222; C11D 3/1253; C11D 3/126; C11D 3/14; C11D 1/722
See application file for complete search history.

(56) References Cited

U.S. PATENT DOCUMENTS

| | | | | |
|---|---|---|---|---|
| 4,375,416 A * | 3/1983 | Crisp | C11D 1/40 | 510/307 |
| 6,455,751 B1 | 9/2002 | Hoffman et al. | | |
| 6,984,618 B2 * | 1/2006 | Heinzman | C11D 17/06 | 510/516 |
| 7,425,528 B2 * | 9/2008 | Simonsen | A23K 40/30 | 510/438 |
| 7,737,320 B1 | 6/2010 | Kaminski et al. | | |
| 2005/0020476 A1 * | 1/2005 | Wahl | C11D 3/001 | 510/515 |
| 2006/0211592 A1 | 9/2006 | Faure et al. | | |
| 2008/0207476 A1 * | 8/2008 | Artiga Gonzalez | C11D 3/126 | 512/4 |
| 2008/0228022 A1 | 9/2008 | Faure et al. | | |
| 2011/0186444 A1 | 8/2011 | Cuer et al. | | |
| 2012/0121459 A1 | 5/2012 | Edgington et al. | | |
| 2012/0196787 A1 * | 8/2012 | Ghosh Dastidar | C11D 9/262 | 510/491 |
| 2016/0057993 A1 | 3/2016 | Ludwig et al. | | |
| 2016/0120768 A1 * | 5/2016 | Morioka | A61Q 5/02 | 510/130 |
| 2018/0023042 A1 | 1/2018 | Lant et al. | | |
| 2018/0104177 A1 * | 4/2018 | Constantine | C11D 3/382 | |
| 2021/0370205 A1 * | 12/2021 | Wang | C02F 1/44 | |

FOREIGN PATENT DOCUMENTS

| | | |
|---|---|---|
| CN | 101717701 B | 12/2011 |
| CN | 103374482 A | 10/2013 |
| EP | 0642846 A1 | 3/1995 |
| FR | 2967422 A1 | 5/2012 |
| GB | 2328783 A | 3/1999 |
| JP | 2015-163848 A | 9/2015 |

(Continued)

OTHER PUBLICATIONS

International Search Reoort for PCT/FR2019I052945 dated Mav 19. 2020 and translation thereof.
Written Opinion for PCT/FR2019/052945 dated May 19, 2020
Search Report for French application No. 1872500 dated Sep. 13, 2019.
Nouryon, "Finnfix Product Line Cellulose Ethers," https://www.nouryon.com/product/finnfix-sodium-carboxymethylcellulose/, pp. 1-4, Apr. 26, 2024.
Burnett et al., "Safety Assessment of PEGylated Oils as Used in Cosmetics"; International Journal of Toxicology, vol. 33(Supplement 4), pp. 13S-39S, (2014).

(Continued)

*Primary Examiner* — Charles I Boyer
(74) *Attorney, Agent, or Firm* — Chrisman Gallo Tochtrop LLC

(57) ABSTRACT

A decontamination paste comprising at least one inorganic viscosifier selected from clays, at least one compound in the form of fibers and optionally further one or more optional components, the remainder being of solvent. A method for decontaminating a substrate made of a solid material using the paste, the substrate being contaminated by at least one contaminant species referred to as the labile contaminant species and/or by at least one contaminant species referred to as the surface contaminant species located on one of the surfaces thereof, and/or by at least one contaminant species referred to as the subsurface contaminating species located just below said surface, and/or by at least one contaminant species located under the surface in the depth of the substrate.

18 Claims, 2 Drawing Sheets

(56) References Cited

FOREIGN PATENT DOCUMENTS

| | | | |
|---|---|---|---|
| RU | 2513206 | C1 | 4/2014 |
| WO | 2004008463 | A2 | 1/2004 |
| WO | 2007039598 | A2 | 4/2007 |
| WO | 2010037809 | A1 | 4/2010 |
| WO | 2014154817 | A | 10/2014 |

* cited by examiner

DECONTAMINATION PASTE CONSISTING OF CLAYS AND MICROFIBERS AND METHOD FOR DECONTAMINATING A SOLID MATERIAL USING SAID PASTE

CROSS-REFERENCE TO RELATED APPLICATIONS

This is a National Stage application of PCT international application PCT/FR2019/052945, filed on Dec. 5, 2019, which claims the priority of French Patent Application No. 1872500, filed Dec. 7, 2018, both of which are incorporated herein by reference in their entirety.

TECHNICAL FIELD

One object of the present invention is a decontamination paste for use in decontaminating substrates made of contaminated solid materials.

The present invention is further directed to a decontamination method using this decontamination paste.

By decontamination or depollution of a substrate, it is meant the removal of pollutants, contaminants, from this substrate.

By contaminants, or contaminant species, it is generally meant substances, compounds, which are not normally part of the substrate material and the presence of which is undesirable.

These contaminants may be situated on a surface of the substrate, just below the surface of the substrate (in subsurface), or deep in the substrate.

The method and paste according to the invention allow the decontamination of all kinds of materials, such as metal, plastic, mineral materials such as glassy materials.

The method and paste according to the invention are equally applicable to the decontamination of dense material substrates as to the decontamination of porous material substrates such as cementitious materials like mortars and concretes; bricks; plasters; and natural stone.

The method and paste according to the invention also allow the removal of all kinds of contaminants and especially chemical, biological, or nuclear, radioactive contaminants.

The method and paste according to the invention may therefore be especially referred to as NRBC (Nuclear, Radiological, Biological, Chemical) decontamination method and paste.

The technical field of the invention may thus be generally defined as that of the decontamination of contaminated substrates with a view to removing the pollutants, contaminants, contaminant species which are situated on their surface, just below their surface (in subsurface), or deep in the substrate.

STATE OF PRIOR ART

The decontamination or depollution of solid materials is a problem which arises in many fields, especially in the nuclear industry, for example for sanitation or maintenance operations on facilities, in some industries using toxic chemical products, but also, for example, in the context of decontamination operations which may be necessary following a NRBC (Nuclear, Radiological, Biological and Chemical) type accident.

Different types of contamination of a solid material may be identified:

- labile contamination, especially in the form of dust, not adhering to the surface to be decontaminated.
- so-called "surface contamination": the contaminants are present and adhere to the surface of the substrate made of a solid material (within a grease layer for example).
- so-called sub-surface contamination: the contamination is embedded in the first (that is) microns from the surface of the solid substrate (within a layer of an oxide of a metal, for example).
- deep (in depth) contamination which is specific to substrates made of porous materials. The contaminants have diffused within the porous network and are found embedded in the material to a depth of a few millimetres, or even centimetres.

As a part of decontamination operations, the method used is generally adapted to the type of contamination targeted and to the outlets for the final waste generated.

Thus, labile contamination may be removed by using methods implementing a simple suction of this contamination. Labile contamination may also be removed by applying a peelable gel to the surface to be decontaminated, which will then act as an adhesive tape and pull the labile contamination off the support [1].

These peelable gels are organic and are only effective for labile contamination. As a result, they generate organic waste. In addition, applying them with too high a thickness (for example more than 2 mm) may lead to gel runs which will weaken the mechanical properties of the peelable gel formed.

There are different methods to treat surface and subsurface contamination:

- mechanical methods based on cutting, physical abrasion, shot blasting or shaving, levelling techniques. Although these methods are inexpensive and relatively simple to implement, they turn out to be very tedious and hard for the operators, they degrade the structure of the material and generate a large volume of waste.
- chemical methods using acidic, basic or oxidising solutions. Such methods rely on the corrosion of the material over a few microns in order to extract contaminants therefrom. The material is therefore slightly degraded and decontamination thereof is only carried out at shallow depths. In addition, liquid waste is produced, which then has to be treated and recovered. These acidic, basic or oxidising solutions may also be incorporated into decontamination gels [2] or foams [3] in order to improve their efficiency and reduce the volume of secondary waste generated.

Methods using foams generate liquid effluent in a small amount.

Methods using gels generate millimetre size solid waste that may be sucked, vacuumed, provided that their application by spraying is well controlled. Indeed, controlling the thickness of the gel deposited is essential in these methods in order to avoid formation of a waste that is too thin and too adherent to the substrate (in the case of depositing a gel thickness that is too thin) or the occurrence of runs on non-horizontal surfaces (in the case of depositing a gel thickness that is too thick).

These gels do not allow the treatment of porous materials and generally do not confine the contaminant species properly.

Finally, chemical methods are thus mainly effective for surface and sub-surface decontamination and are not very effective for removing contaminants deeply embedded in a substrate.

methods based on laser ablation [4]. This type of method consists in eroding successive layers of the contaminated material using a laser beam coupled with a suction system allowing the recovery of the generated waste. However, these "laser" methods are rather expensive and restrictive to implement.

Deep, in depth, decontamination of porous materials is much more complex than labile, surface or sub-surface decontamination because contaminants tend to be deeply incorporated into the porous network.

Anyway, the methods set forth above for surface and sub-surface decontamination may still be used for deep, in depth, decontamination but, on the one hand, their efficiency is limited and, on the other hand, they produce a very large amount of secondary waste which can be problematic to handle, especially in the case of a nuclear decontamination operation.

However, these are specific methods for deep, in depth, decontamination of porous materials.

First of all, there are electrokinetic methods [5] which are based on the electro-migration of ionic contamination within the porous material, especially within reinforced concretes, by placing electrodes and applying a current. These methods have a high production cost and require quite substantial resources for their implementation. In addition, the application of excessive currents can lead to the degradation of the infrastructure during treatment.

Document [6] in turn sets forth a method for decontaminating porous materials deeply contaminated by radionuclides. The method described is dedicated to ionic nuclear contamination, and no indication is given as to the possibility of modifying it for use in fields other than the nuclear industry. This document sets forth a two-step method. In a first step, the porous material is soaked with an ionic solution likely to solubilise radionuclides present in the porosity. This first step may lead to runs and the production of liquid effluents that are difficult to recover and treat. In addition, in the case of zones with complex geometries or large surface areas such as facility walls, the porous material may be inhomogeneously soaked, thus reducing the efficiency of the method. Following this first soaking step, an organic hydrogel containing radionuclides chelating agents is brought into contact with the soaked porous material in order to extract the solubilised contaminants.

Document [6] only mentions organic gelling agents which can be sensitive to irradiation, especially in the specific case of nuclear decontamination, and which could produce radiolysis gases (especially $H_2$).

This problem may turn out to be unacceptable to packaging of the final waste.

The claims in this document are directed to a dry composition before mixing with an aqueous solution but no information is given about the composition of the hydrogel and especially on the influence of the amount of aqueous solution to be added. Furthermore, no clear indication is given regarding the application method and use of the hydrogel. In particular, this document does not discuss influence of the thickness of the deposited hydrogel, the means for implementing this hydrogel as well as the amounts of hydrogel necessary to treat a given surface.

Document [7] sets forth a dry compress, pad composition to be used for cleaning or desalting porous materials, more particularly for treating polluted stones in the context of monument restoration.

This dry composition comprises a binder, a filler and a mineral fibre. Due to the very restrictive target application, that is desalination and cleaning of historical monuments, very specific criteria have to be met (mainly safety criteria), giving rise to rather complex dry compress compositions with at least 3 components.

This document also relates to a ready-to-use cleaning or desalination compress which comprises the dry composition, from 50% to 80% by weight of a solvent, and possibly a solubilising reagent.

The compress is then applied to the surface to be treated.

The compress is then allowed to dry and the salts solubilised in the solvent which has penetrated the material to be treated are extracted by migration to the compress. After drying, the remnants of the compress are removed by a final rinse, producing liquid effluents, and by simultaneous suction.

The efficiency of the cleaning and/or desalination achieved by the compress of document [7] is not proven, especially by practical examples, and is probably low. Generally speaking, the use of compresses is still strictly limited to desalination of stones in the context of monument restoration.

Furthermore, it should be noted that the treatment of vertical walls rises particular problems. For example, in order to treat a vertical wall over a large area with a gel or a compress, a significant thickness of deposit is sometimes necessary in order to obtain a high decontamination efficiency and a non-powdery waste (in the case of the decontamination of dense substrates with gels, for example) or in order to decontaminate a vertical porous surface by extraction mechanisms based on physical phenomena such as fluid transfer or advection. However, the composition of the gels and compresses described respectively in documents [2] and [7] does not allow these gels and compresses to "hold" on a vertical wall, to cling to this wall, without sagging, running, when they are applied to this vertical wall with a significant thickness, especially a centimetric thickness.

The maximum thickness of these gels and compresses that can be applied without sagging is a few millimetres.

In view of the above, there is therefore a need for a decontamination composition, product, and for a decontamination method which do not have the drawbacks, defects, limitations and disadvantages of the decontamination, compositions, products of the prior art as especially represented by the compositions and methods described above in documents [1] to [7].

In particular, there is a need for a decontamination composition, product, and for a decontamination method which deliver the following improvements, especially with respect to decontamination suctionable gels and methods implementing these gels:

- an improvement in the properties of the final waste. Indeed, suctionable gels do not generally confine contaminant species properly, which are only adsorbed on the surface of the final waste or mechanically trapped within the dry gel flakes.
- an improvement in the size of the final waste. Indeed, suctionable gels used for surface or sub-surface decontamination generate non-powdery waste of millimetre size. It would therefore be desirable to obtain larger size waste to avoid its resuspension in the air.
- an improvement in the versatility, reliability and reproducibility of the method. Indeed, the efficiency of methods implementing suctionable gels relies to a large extent on an implementation by spraying, which has to be well controlled. In some cases, a poor application of the gel, especially if the applied gel layer applied is too thin, leads to a poor decontamination and to the formation of a solid waste that is also too thin and too adherent to the substrate. This too thin and too adherent waste proves to be difficult to recover. It would therefore be desirable to have a method that is easy to implement, reliable, reproducible, precise, and more robust than known methods, and which is much less sensitive to the hazards that may occur during its implementation.

Apart from in depth, deep, abrasion methods, there is currently no decontamination composition and method that allows effective in depth, deep, decontamination of a material. It would therefore be desirable to have a composition and method that would allow such in depth, deep, decontamination while generating a low volume of final waste.

In summary, there is currently no decontamination composition or method that allows at the same time satisfactory labile, surface, sub-surface and in depth, deep, decontamination of solid materials. And, there is therefore a need for such a composition and such a method which are, furthermore, inexpensive, reliable and easy to implement, which do not produce liquid effluents but only solid waste of a large size, namely generally greater than one centimetre.

Especially, there is a need for an effective composition and effective method for in depth, deep, nuclear decontamination of porous materials. These materials may have a large surface area.

DISCLOSURE OF THE INVENTION

This goal and still other goals are achieved, in accordance with the invention, with a decontamination paste comprising, preferably consisting of:

- at least one inorganic viscosifier (viscosifying agent) selected from clays, said inorganic viscosifier representing from 20% to 70% by weight, preferably from 35% to 70% by weight, more preferably from 40% to 65% by weight, better from 45 to 55% by weight of the total weight of the paste, and said inorganic viscosifier being in the form of micron- and/or nano-sized particles;
  - at least one compound in the form of fibres;
- optionally, furthermore, one or more component(s) selected from the following components:
  - at least one surfactant;
  - at least one active decontamination agent;
  - at least one contaminant species extracting agent;
  - at least one contaminant species chelating agent;
  - at least one colouring agent;
- and the balance of solvent.

Advantageously, said component(s) is (are) present in the following proportions:

- 0.1 to 8 or 10% by weight, preferably 0.1 to 5% by weight, more preferably 0.5 to 5% by weight, better 1 to 5% by weight, still better 1 to 3% by weight based on the weight of the paste, of the at least one compound in the form of fibres;
- optionally, 0.1 to 2% by weight, based on the weight of the paste, of the at least one surfactant;
- optionally, 0.1 to 10 mol/L of paste, preferably 0.5 to 10 mol/L of paste, more preferably 1 to 10 mol/L of paste, and better 3 to 6 mol/L of paste, of the at least one active decontamination agent;
- optionally, 0.1% to 5% by weight, based on the weight of the paste, of the at least one contaminant species extracting agent;
- optionally, from 0.1% to 5% by weight, based on the weight of the paste, of the at least one contaminant species chelating agent;
- optionally 0.01% to 10% by weight, preferably 0.1% to 5% by weight, based on the weight of the paste, of the at least one colouring agent;
- and the balance of solvent.

The sum of the percents by weight of all the components, constituents of the paste, is of course 100% by weight.

By "the balance of solvent", it is meant that the solvent is always present in the paste, and that the amount of solvent is an amount such that, when added to the amounts of the paste components other than the solvent (whether these components are mandatory or optional components mentioned above, or still other optional additional components mentioned or not mentioned), the total amount of all the paste components is 100% by weight.

By micron-sized particles, it is meant that these particles have an average size, generally defined by their largest dimension of more than 0.1 μm to 100 μm, preferably from 1 to 100 μm, for example from more than 0.1 μm to 4.5 or 10 μm.

Preferably, said inorganic viscosifier is only found in the form of micron-sized particles.

By nano-sized particles it is meant that these particles have an average size, generally defined by their largest dimension from 1 to 100 nm.

The paste according to the invention comprises a specific amount of a specific clay-like inorganic viscosifier giving the paste a viscosity adapted to its implementation, at least one compound in the form of fibres, and a solution comprising a solvent, and optionally one or more optional components which are generally selected according to the particular application which is made of the paste.

The term "paste" is well known to the man skilled in the art, who knows that a paste is intrinsically different from a gel consisting of a colloidal solution.

The paste according to the invention generally has a viscosity greater than or equal to 100 Pa·s at 20° C. for a shear rate of less than 1 $s^{-1}$.

Depending on the component(s) it contains, the solution enables the substrate to be attacked, etched, the contaminant species to be solubilised or the contaminant species to be scavenged, fixed, during the decontamination step (see below).

The decontamination paste according to the invention has never been described or suggested in prior art.

The decontamination paste according to the invention differs fundamentally from the decontamination compositions according to the prior art and especially from the suctionable gels of the prior art in that it contains a specific inorganic viscosifier selected from clays and not from silicas and aluminas, and in that the amount of this inorganic viscosifier in the paste is greater than the amount of inorganic viscosifier in the suctionable gels. Indeed, the amount of this inorganic viscosifier in the paste is from 20% to 70% by weight, preferably from 35% to 70% by weight, more preferably from 40% to 65% by weight, better from 45 to 55%. The decontamination paste according to the invention further differs fundamentally from the decontamination compositions of the prior art and especially from the suctionable gels of the prior art in that it contains at least one compound in the form of fibres.

Furthermore, the inorganic viscosifier is preferably only in the form of micron-sized particles.

This micron size also promotes large size solid waste to be obtained.

The paste according to the invention meets all the needs listed above, achieves the goals mentioned above and solves the problems of the decontamination compositions of the prior art.

Thus, the paste according to the invention surprisingly makes it possible, at the same time, to remove the labile contamination, the sub-surface contamination, and the in depth, deep, contamination (for example the contamination embedded within a porous network of a substrate made of a porous material).

Due to the specific inorganic viscosifier, selected from clays, it contains, due to the specific large amount of inorganic viscosifier and preferably due to the presence of the inorganic viscosifier in the specific form of micron-sized particles, the paste according to the invention can, surprisingly, hold, without running, without sagging on vertical walls even when applied to these walls with a thickness much greater than that with which suctionable gels are applied. This thickness is especially 2 to 5 mm.

As the paste according to the invention further contains a compound in the form of fibres, this thickness may then be greater than 5 mm.

Due to the large and significantly increased deposition thickness (in comparison with suctionable gels) that can be achieved with the paste according to the invention, the decontamination effect, especially the corrosive effect, is greater, thus enabling deeper and sub-surface decontamination.

Despite the large, specific amount of inorganic viscosifier it contains, the paste according to the invention retains, however, an easy-to-handle consistency allowing it to be easily applied to any surface. Furthermore, the number of fractures which occur upon drying the paste according to the invention is considerably reduced in comparison with suctionable gels and a solid waste consisting of pieces, non-powdery particles, and with much larger sizes than waste obtained after drying suctionable gels is obtained.

The waste obtained after drying of the gel according to the invention generally has a size (the size being defined by its largest dimension) greater than or equal to one cm, or even greater than or equal to 10 cm. Often, the final dry waste has few (for example one, two) or no fractures, and is therefore of the same size as the initially deposited "wet" gel deposit (see examples).

The use of clays avoids fractures because they are better organised during drying.

Within the waste, which is large in size, the contaminant species may be chemically adsorbed.

The presence in the paste according to the invention of a compound in the form of fibres, even in the small amounts mentioned above, ensures a better internal hold of the paste without modifying its advantageous decontamination and drying properties. Thus, the compound in the form of fibres ensures that an even greater thickness of paste, for example greater than or equal to 5 mm, preferably greater than or equal to 6, 7, 8 or 9 mm, more preferably of at least 10 mm, and up to 50 mm, for example, can hold on a vertical wall without sagging, and after drying a solid, non-powdery waste is always obtained. This is demonstrated in example 4.

It is to be noted that it is not necessary for the paste to contain one or more of the optional components mentioned above.

Indeed, for some types of contaminant species, a paste only comprising the solvent, the viscosifier, and the compound in the form of fibres, allows the method according to the invention to be successfully implemented by trapping, capturing, catching the contaminant species, and allows the effects and advantages listed above to be achieved. In this case, for these types of contaminant species, the clays both act as a viscosifier and as a "trapper", "fixer".

However, for other types of contaminant species, which are not "trappable" by the clay, optional components are required to trap these contaminant species. These optional components may be contaminant species extracting agents and/or contaminant species chelating agents.

The presence of a surfactant in the paste according to the invention favourably and significantly influences the rheological properties of the paste. This surfactant especially promotes viscosity restoration, recovery, of the paste following its application and avoids spreading or running risks when the paste is deposited onto vertical surfaces and ceilings.

The presence in the paste of at least one active decontamination agent makes it possible to remove, eliminate, destroy, inactivate, kill, extract contaminant species, whether they are labile, surface, sub-surface or in depth, deep species below, under, the surface of the solid substrate.

The presence in the paste of at least one contaminant species extracting and scavenging, fixing agent, such as an inorganic adsorbent, facilitates capture and scavenging, fixing, of the contaminant species, and also makes it possible to avoid a release of the contaminant species in the event of a possible leaching, especially an undesired leaching, of the final dry and solid waste. The treatment of the waste resulting from the decontamination operation using the paste according to the invention is greatly facilitated.

As has already been set out above, clays may, in some cases, both act as a viscosifier and as a "trapper", "fixer".

The presence in the paste of at least one contaminant species chelating agent also facilitates capture and fixing, scavenging of the contaminant species.

In particular, the presence of extracting and/or chelating agents in the paste, or more precisely in the solution forming part of the paste, makes it possible to promote recovery of chemically bound contaminants within the porosity of a material, such as, for example, a cementitious material.

The presence of at least one colouring agent in the paste allows for better visualization and identification of the final dry solid residue at the end of the method, regardless of the surface onto which it is deposited, thus facilitating the recovery of this residue.

Due to the implementation of a generally exclusively inorganic, mineral viscosifier, without any organic viscosifier, the organic matter content of the paste according to the invention is generally less than 4% by weight, preferably less than 2% by weight, which is an advantage of the paste according to the invention.

These solid, mineral, inorganic clay particles act as a viscosifier to achieve the sought pasty consistency.

Advantageously, the inorganic viscosifier may be selected from smectites, kaolinites, perlites, vermiculites and mixtures thereof.

The nature of the inorganic, mineral viscosifier unexpectedly influences drying of the paste according to the invention and the grain size of the obtained residue.

The decontamination paste according to the invention contains a compound in the form of fibres.

Advantageously, the fibres may be selected from fibres of organic compounds such as cellulose fibres, and fibres of mineral compounds such as rock wool and glass wool.

The fibres may have a diameter from 2 μm to 10 μm.

The fibres may have a length from 50 μm to 10 mm.

The paste according to the invention may contain an active decontamination agent.

This active decontamination agent may be any active decontamination agent enabling the removal of a contaminant species whatever the nature of this contaminant species: whether this contaminant species is chemical, biological or even nuclear, radioactive—in other words, this decontamination agent may be any "NRBC" (Nuclear, Biological, Radiological, Chemical) decontamination agent—, or whether this contaminant species is organic or mineral, liquid or solid.

The paste according to the invention may thus contain a biological or chemical or even nuclear, radioactive active decontamination agent.

The active decontamination agent may also be a degreasing or pickling agent in order to remove a possible contaminant species on the surface and possibly below, under, the surface and into the depth of the substrate.

Some active decontamination agents may perform several decontamination functions simultaneously.

By biological decontamination agent, which may also be described as a biocidal agent or a disinfecting agent, it is meant any agent which, when brought into contact with a biological species and especially a toxic biological species, is likely to inactivate or destroy it.

By biological species, it is meant any type of microorganism such as bacteria, fungi, yeast, viruses, toxins, spores, especially *Bacillus anthracis* spores, prions and protozoa.

The biological species that are removed, eliminated, destroyed, inactivated, by the paste according to the invention are essentially biotoxic species such as pathogenic spores like, for example, *Bacillus anthracis* spores, toxins like, for example, botulinum toxin or ricin, bacteria like *Yersinia pestis* bacteria and viruses like vaccinia virus or haemorrhagic fevers viruses, for example of the Ebola type.

By chemical decontamination agent, it is meant any agent which, when brought into contact with a chemical species and especially a toxic chemical species, is likely to destroy or inactivate it.

The chemical species which are removed, eliminated, by the paste according to the invention are especially the toxic chemical species such as toxic gases, in particular neurotoxic or vesicant gases.

These toxic gases are especially organophosphorus compounds, including Sarin or agent GB, VX, Tabun or agent GA, Soman, Cyclosarin, diisopropyl fluoro phosphonate (DFP), Amiton or agent VG, Parathion. Other toxic gases are mustard gas or agent H or agent HD, Lewisite or agent L, agent T.

Nuclear and radioactive species that may be removed by the paste according to the invention may be selected, for example, from metal oxides and hydroxides, especially in the form of solid precipitates.

It is to be noted that in the case of radioactive species, this is not destruction or inactivation but only removal, elimination, of the contamination by dissolution of the irradiating deposits or corrosion of the contamination carrying materials. There is thus a real transfer of the nuclear contamination to the solid waste obtained after drying the paste.

The active decontamination agent, for example the active biological or chemical decontamination agent, may be selected from bases such as sodium hydroxide, potassium hydroxide, and mixtures thereof; acids such as nitric acid, phosphoric acid, hydrochloric acid, sulphuric acid, hydrogen oxalates such as sodium hydrogen oxalate, and mixtures thereof; oxidising agents such as peroxides, permanganates, persulphates, ozone, hypochlorites such as sodium hypochlorite, cerium IV salts, and mixtures thereof; quaternary ammonium salts such as hexadecylpyridinium (cetylpyridinium) salts, such as hexadecylpyridinium (cetylpyridinium) chloride; reducing agents; and mixtures thereof.

For example, the active decontamination agent may be a disinfectant agent such as bleach ("Eau de Javel"), which provides the paste with decontamination, biological and/or chemical depollution properties.

Some active decontamination agents may be classified in several of the categories defined above.

Thus, nitric acid is an acid, but also an oxidising agent.

The active decontamination agent, such as a biocidal agent, is generally used at a concentration from 0.1 to 10 mol/L of paste, preferably from 0.5 to 10 mol/L of paste, more preferably from 1 to 10 mol/L, and better from 3 to 6 mol/L of paste in order to guarantee decontamination power, for example inhibition power of the biological species, especially biotoxic species, compatible with the drying time of the paste, and to ensure, for example, drying of the paste at a temperature of between 20° C. and 50° C. and at a relative humidity of between 20% and 60% on average in 30 minutes to 5 hours.

In order to achieve full efficiency, including under the most unfavourable temperature and humidity conditions with regard to drying time, the formulation of the paste withstands different concentrations of active agent. It may indeed be noticed that the increase in the concentration of decontamination agent, in particular of acidic or basic decontamination agent, dramatically increases the drying time of the paste and thus the efficiency of the method.

The active decontamination agent may be an acid or a mixture of acids. These acids are generally selected from mineral acids such as hydrochloric acid, nitric acid, sulphuric acid and phosphoric acid.

A decontamination agent, especially a biological decontamination agent, that is particularly preferred, is nitric acid.

Indeed, it has been found, totally surprisingly, that nitric acid destroys and inactivates biological, especially biotoxic species.

In particular, it has been surprisingly evidenced that nitric acid performs destruction and inactivation of spores such as *Bacillus thuringiensis* spores, which are particularly resistant species.

The acid(s) is (are) preferably present at a concentration from 0.5 to 10 mol/L, more preferably from 1 to 10 mol/L, better from 3 to 6 mol/L to ensure drying of the paste generally at a temperature of between 20° C. and 50° C. and at a relative humidity of between 20% and 60% on average in 30 minutes to 5 hours.

Another preferred decontamination agent is a mixture of nitric acid and phosphoric acid. The paste according to the invention may then consist of a clay, such as kaolinite, and an acidic aqueous nitric acid solution, for example 1M, and phosphoric acid, for example 1M, the clay accounting for, for example, from 40% to 60% by weight of the weight of the paste, and the acidic aqueous solution accounting for, for example, from 60% to 40% by weight of the weight of the paste.

Or, the active decontamination agent, for example the active biological decontamination agent, may be a base, preferably a mineral base, preferably selected from soda, potash, and mixtures thereof.

In the case of such a basic paste formulation, the paste according to the invention has, further to the decontamination action, a degreasing action which allows also possible contaminant species on the surface of the substrate to be removed, eliminated.

As already mentioned above, in order to achieve total efficiency, including under the most unfavourable weather conditions with regard to the drying time of the paste, the paste according to the invention may have a wide range of concentration of basic decontamination agent(s).

Indeed, increasing the concentration of basic decontamination agent such as NaOH or KOH, which generally act as a biocidal agent, makes it possible to dramatically increase the inhibition rates of biological species, as has been demonstrated for *Bacillus thuringiensis* spores.

The base is advantageously present at a concentration of less than 10 mol/L, preferably between 0.5 and 7 mol/L, more preferably between 1 and 5 mol/L, better between 3 and 6 mol/L, to ensure drying of the paste at a temperature of between 20° C. and 50° C. and a relative humidity of between 20% and 60% on average in 30 minutes to 5 hours.

The decontamination agent, in particular when it is a biological decontamination agent, is preferably sodium hydroxide or potassium hydroxide.

With regard, for example, to the spores inhibition kinetics and drying times of the pastes as a function of temperature, the active decontamination agent, especially when it is a biocidal agent, is preferably sodium hydroxide at a concentration of between 1 and 5 mol/L.

The paste according to the invention may optionally also contain a surfactant or a mixture of surfactants, preferably selected from the family of non-ionic surfactants such as block copolymers, like ethylene oxide and propylene oxide block copolymers, and ethoxylated fatty acids; and mixtures thereof.

For this type of paste, the surfactants are preferably block copolymers marketed by the BASF Company under the name PLURONIC®.

Pluronics® are ethylene oxide and propylene oxide block copolymers.

These surfactants influence the rheological properties of the paste, especially the thixotropic character of the product and its recovery time, and avoid the occurrence of runs.

Advantageously, the contaminant species extracting agent is selected from inorganic adsorbents such as zeolites, clays, phosphates such as apatites, titanates such as sodium titanates, and ferrocyanides and ferricyanides.

This optional extracting agent such as a zeolite or a clay may be used in the case where the contaminant species is a radionuclide, but this optional extracting agent may also be used in the case of contaminant species other than radionuclides, such as for example metals, like toxic metals or heavy metals.

Advantageously, the contaminant species chelating agent is selected from n-octylphenyl-N,N-diisobutylcarbamoyl methylphosphine oxide (CMPO), tributyl phosphate (TBP), 1-hydroxyethane-1,1-diphosphonic acid (HEDPA), di-2-ethylhexylphosphoric acid (DHEPA), trioctylphosphine oxide (TOPO), diethylenetriamine pentaacetate (DTPA), primary, secondary and tertiary organic amines, cobalt dicarbollide, calixarenes, niobates, ammonium molybdophosphate (AMP), (trimethylpentyl)phosphinic acid (TPPA), and mixtures thereof.

The extracting agent may sometimes act as a chelating agent and vice versa.

Advantageously, the colouring agent is selected from dyes, preferably organic dyes, and pigments, preferably mineral dyes.

Advantageously, the pigment is a mineral pigment. In this respect, reference may be made to document WO-A1-2014/154817 [7].

There is no limitation as to the mineral pigment that is incorporated in the paste according to the invention.

Generally, the mineral pigment is selected from mineral pigments that are stable in the paste.

By stable pigment it is generally meant that the pigment does not show a stable change in colour over time, when the paste is stored for a minimum of 6 months.

There is no limitation as to the colour of this pigment, which is generally the colour it will impart to the paste. This pigment can be of black, red, blue, green, yellow, orange, purple, brown, etc., and even white colour.

In general, the paste has a colour identical to the colour of the pigment it contains. However, it is possible that the paste has a colour that differs from the colour of the pigment it contains, but this is not intended.

The pigment, especially when it is white, is generally different from the inorganic viscosifier.

Advantageously, the mineral pigment is selected so that it gives the paste after drying a colour different from the colour of the surface onto which the paste is deposited.

Advantageously, the mineral pigment is a micronized pigment, and the average particle size of the mineral pigment may be from 0.05 to 5 μm, preferably from 0.1 to 1 μm.

Advantageously, the mineral pigment is selected from metal(s) and/or metalloid(s) oxides, metal(s) and/or metalloid(s) hydroxides, metal(s) and/or metalloid(s) oxyhydroxides, metal(s) ferrocyanides and ferricyanides, metal(s) aluminates, and mixtures thereof.

Preferably, the mineral pigment is selected from iron oxides, preferably micronized, and mixtures thereof.

Indeed, iron oxides may have different colours, they may be for example yellow, red, purple, orange, brown, or black.

Indeed, iron oxide pigments are known to have a good covering power and a high resistance to acids and bases.

For incorporation into a decontamination paste, iron oxides offer the best performance in terms of stability and colouring power. For example, an iron oxide content of 0.1% or even 0.01% by weight is sufficient to strongly colour the paste without changing properties thereof.

Micronized iron oxides are available from Rockwood® Company under the trade name Ferroxide®.

Mention may be made of Ferroxide® 212 M which is a micronized red iron oxide with an average particle size of 0.1 μm and Ferroxide® 228 M which is a micronized red iron oxide with an average particle size of 0.5 μm.

In addition to and/or instead of iron oxides, other coloured metal or metalloid oxides or hydroxides may be incorporated into the paste according to the invention, depending on the pH of the paste, mention may especially be made of vanadium oxide ($V_2O_5$) which is orange, manganese oxide ($MnO_2$) which is black, cobalt oxide which is blue or green, and rare earth oxides. However, iron oxides are preferred for the reasons set out above.

Among oxyhydroxides, goethite may be mentioned, that is iron oxyhydroxide FeOOH, which is very colourful.

By way of example of a metal ferrocyanide, mention may be made of Prussian blue, that is ferric ferrocyanide, and by way of example of an aluminate, mention may be made of cobalt blue that is cobalt aluminate.

The solvent for the paste according to the invention is generally selected from water, organic solvents, and mixtures thereof.

A preferred solvent is water, and in this case the solvent therefore consists of water, comprises 100% water.

The paste according to the invention may in some cases be defined as a so-called "reabsorbent" paste, in which case the paste is then specifically formulated to be supersaturated with solution, with solvent. Such a "reabsorbent", "supersaturated" paste in particular enables deeply, in depth, contaminated porous materials to be decontaminated. When such a paste is deposited onto a porous surface, part of the solvent of the paste spontaneously soaks into the pores of the material and solubilises the contaminant species (contaminants).

It should be noted that no theoretical ratio of supersaturation of a paste is defined herein. The supersaturation of a paste corresponds to its ability to lose a part of its solvent (such as water) while remaining saturated. That is, the paste will contract in order to replace this "lost" part of solvent (for example water) which represents the supersaturation with solvent, for example water.

The supersaturation therefore depends essentially on the composition of the paste, that is on the type of materials included in the paste and on their concentrations.

The solution may be formulated to specifically react with the porous material to promote solubilisation of the contaminant species, contaminants, for example by chemical attack, chelation of the contaminant etc.

The paste is first brought into contact with the surface of the solid porous substrate to be decontaminated. Once an equilibrium has been reached between saturation of the paste with solution and soaking of the porous material, the paste starts to dry, because the solvent evaporates at the paste-air interface. The solution soaked in the material is then reabsorbed within the paste under the effect of capillary re-equilibration, at the same time carrying away the solubilised contaminants by advection and thus allowing decontamination of the porous material.

The invention further relates to a method for decontaminating a substrate made of a solid material, said substrate being contaminated by at least one contaminant species called a labile contaminant species and/or by at least one contaminant species called a surface contaminant species located on one of its surfaces, and/or by at least one contaminant species called a subsurface contaminant species located just below (under) said surface, and/or by at least one contaminant species located below (under) said surface, deep in the substrate, in the depth of the substrate, wherein at least one cycle is carried out, comprising the following successive steps of:

a) applying the paste according to the invention as described above on said surface b) maintaining (holding) the paste on the surface at least for a sufficient time for the paste to destroy and/or inactivate and/or absorb and/or solubilise the contaminant species, and for the paste to dry and form a dry and solid residue containing said contaminant species;

c) removing (eliminating), the dry and solid residue containing said contaminant species.

The decontamination method implements the paste according to the invention as described above and therefore has all the advantageous effects inherent to this paste which have been described above especially relating to the thickness applied and the size of the dry solid residue obtained.

In particular, as has already been mentioned above in the context of the description of the paste, the presence in the paste according to the invention of a compound in the form of fibres, even in the small amounts mentioned above, ensures a better internal hold of the paste without modifying its advantageous decontamination and drying properties. Thus, the compound in the form of fibres ensures that an even greater thickness of paste, for example greater than or equal to 5 mm, preferably greater than or equal to 6, 7, 8 or 9 mm, more preferably at least 10 mm—and up to 50 mm, for example—may be held on a vertical wall without sagging, and at the end of drying a solid, non-powdery waste is always obtained. This is demonstrated in Example 4.

The decontamination mechanism by a paste that occurs in the method according to the invention differs according to the type of decontamination.

In the case of a labile, surface or sub-surface contamination, the paste is deposited onto the contaminated surface and the viscosifier allows prolonged contact between the decontaminant solution (paste solvent) and the contaminated substrate.

Depending on the decontamination active possibly added to the formulation, the paste can solubilise the labile and surface contamination but also corrode the substrate over several μm to solubilise the sub-surface contamination.

The paste finally dries to produce a dry solid residue of at least centimetre size containing the contaminant species.

This mechanism is similar to that known with suctionable decontamination gels. However, the paste according to the invention, implemented in the method according to the invention, contains a specific inorganic viscosifier selected from clays and a compound in the form of fibres, and can be applied with a much greater thickness than that with which gels are applied. The truly synergistic combination of these characteristics, namely inorganic viscosifier selected from clays, compound in the form of fibres, and high applied thickness, surprisingly makes it possible to obtain a dry solid residue comprising, in contrast to suctionable gels, few or no fractures, cracks, and therefore consisting of one or more piece(s) with a much larger size than the suctionable gel flakes.

Indeed the use of clays avoids fractures, cracks, because they are better organised during the drying process.

In general, in the method according to the invention, the aim is to avoid fractures, cracks, in contrast to methods that implement suctionable gels in which the aim is to produce fractures.

The method according to the invention makes it possible to solidly fix, immobilise, the contaminant species within the dry paste, the dry solid residue, thus avoiding a possible release in case of leaching of the dry and solid residue.

The method according to the invention is a reliable and reproducible method that may be described as a robust method, and the efficiency of the method is not very dependent on the way the paste is deposited. Thus, unlike suctionable gels which require fine control of their application by spraying, and by virtue of their improved hold on wall properties, the pastes according to the invention may be spread manually on the contaminated surfaces, for example by a trowel, or preferably, using a spraying machine in the manner of a mortar or coating.

The substrate made of a solid material may be a porous substrate, preferably a porous mineral substrate.

However, the efficiency of the paste and of the method according to the invention is just as good in the presence of a dense, non-porous and/or non-mineral surface.

Advantageously, the substrate is made of at least one solid material selected from metals and metal alloys such as stainless steel, painted steels, aluminium, and lead; polymers such as plastic materials or rubbers such as poly(vinyl chloride)s or PVCs, polypropylenes or PPs, polyethylenes or PEs, especially high density polyethylenes or HDPEs, poly (methyl methacrylate)s or PMMAs, poly(vinylidene fluoride)s or PVDFs, polycarbonates or PCs; glasses; cements and cementitious materials; mortars and concretes; plasters; bricks; natural or artificial stone; ceramics.

Advantageously, the contaminant species is selected from chemical, biological, nuclear or radioactive contaminant species already listed above and especially from toxic biological species already listed above.

Advantageously, the paste is applied on the surface to be decontaminated in an amount of 2,000 g to 50,000 g of paste per $m^2$ of surface preferably 5,000 g to 10,000 g of paste per $m^2$ of surface, which corresponds approximately to a paste thickness of 2 to 50 mm per $m^2$ of surface, preferably 5 to 10 mm of paste per $m^2$ of surface.

Advantageously, as has already be seen above, the paste may be applied to the surface manually, with a trowel for example, or using a spraying machine.

Advantageously (during step b)), drying is carried out at a temperature from 1° C. to 50° C., preferably 15° C. to 25° C., and under a relative humidity from 20% to 80%, preferably from 20% to 70%.

Advantageously, the paste is maintained on the surface for a period of 2 to 72 hours, preferably 2 to 48 hours.

Advantageously, the dry and solid residue is in the form of one or more piece(s), each of said pieces having a size (defined by their largest dimension) greater than or equal to 1 cm, preferably greater than or equal to 2 cm, more preferably greater than or equal to 5 cm.

Advantageously, the dry and solid residue is removed, eliminated, from the solid surface by a mechanical process such as brushing.

Advantageously, the cycle described above may be repeated, for example, from 1 to 10 times, using the same paste in all cycles or using different pastes in one or more cycle(s).

Advantageously, during step b), the paste, before being completely dried, is rewetted with a solution, for example with a solution of a decontamination agent, preferably with a solution of the active decontamination agent of the paste applied during step a) in the solvent of this paste, which then generally avoids repeating the application of the paste on the surface and results in a saving of reagent and a limited amount of waste. This rewetting operation may be repeated, for example, from 1 to 10 times.

Advantageously, the paste applied during step a) may be a paste supersaturated with solvent (see above), especially in the case where the substrate is made of a porous solid material.

The method according to the invention may be referred to as "regenerative" method because it implements a paste giving a dry and solid waste, residue, which, advantageously, may be regenerated to form a new paste according to the invention, which, if needed, may be used again in the method according to the invention.

The dry and solid waste, residue, in order to be regenerated, may be brought into contact with a solution, comprising a solvent, and optionally one or more of the optional components mentioned above to thereby obtain a paste according to the invention as described above, for example the dry and solid waste, residue may be brought into contact with a solution of a decontamination agent.

The method for decontaminating a substrate made of a solid material according to the invention, especially in the case where this substrate is made of a porous solid material does not require prior soaking of the substrate, especially by virtue of an effective control of the supersaturation (see above) of the paste according to the invention.

In summary, the method and paste according to the invention have, inter alia, the following advantageous properties, in addition to those already mentioned above:

- easy application of the paste,
- adhesion to walls and ceilings,
- obtaining maximum decontamination efficiency at the end of the drying phase of the paste, including in the case of penetrating contamination, especially in the case of porous surfaces.

In general, it is ensured that the drying time is greater than or equal to the period of time required for inactivation. In the case of deep inactivation, rewetting may be resorted to.

- treatment of a very wide range of materials,
- no mechanical or physical deterioration of the materials at the end of the treatment,
- implementation of the method in various weather conditions,
- reduction in the volume of waste,
- ease of recovery of the dry waste.

In conclusion, the applications of the paste and of the surface, sub-surface and in depth, deep decontamination method, especially of porous materials according to the invention, are many and various. One particularly targeted application relates to the nuclear decontamination of cementitious materials with the aim of reducing as much as possible waste generated by sanitation and dismantling operations of nuclear facilities at the end of their life.

However, the problem of decontamination of porous materials also occurs in other fields of activity such as industries using toxic chemical compounds, NRBC (Nuclear, Radiological, Biological and Chemical) post-accident decontamination, architectural conservation of historical monuments, and even in the context of dismantling domestic sites polluted, for example, by toxic molecules, heavy metals, micro-organisms, asbestos, soot particles following a fire etc.

Further characteristics and advantages of the invention will become clearer upon reading the following detailed description, which is illustrative and not limiting, in connection with the attached drawings.

DETAILED DISCLOSURE OF PARTICULAR EMBODIMENTS

Figure 1:
FIG. 1 is a photograph of the Paste-1 prepared in Example 1, in a container.

The paste according to the invention may be easily prepared at room temperature.

For example, the paste according to the invention may be prepared by adding preferably gradually, (successively in any order, and/or simultaneously) the inorganic viscosifier(s), and the compound in the form of fibres to the solvent such as water, preferably deionised water, or to a mixture of the solvent and one or more components selected from components already listed above, namely: a surfactant, an active decontamination agent, a contaminant species extracting agent, a contaminant species chelating agent, and a colouring agent.

This mixing may be achieved by mechanical stirring, for example by means of a mechanical stirrer equipped with a three-blade propeller. The rotational speed is, for example, 200 rpm, and the stirring period of time is, for example, from 3 to 5 minutes.

The addition of the inorganic viscosifier(s) and the compound in the form of fibres to the solvent or to the mixture of the solvent and the above-mentioned component(s) may be carried out by simply pouring the viscosifier(s) and the compound in the form of fibres into said mixture, successively in any order or simultaneously. Upon adding the inorganic viscosifier(s) and/or the compound in the form of fibres, the mixture containing the solvent, this or these inorganic viscosifier(s), and/or the compound in the form of fibres and optionally the above-mentioned component(s) is generally kept under mechanical stirring.

This stirring may be, for example, achieved by means of a mechanical stirrer equipped with a three-blade propeller.

The stirring speed is generally increased gradually as the viscosity of the solution increases, eventually reaching a stirring speed of, for example, between 400 and 600 rpm when all of the inorganic viscosifier(s) and of the compound in the form of fibres have been added, without any splashing having occurred.

After the end of addition of the inorganic mineral viscosifier(s) and of the compound in the form of fibres, the stirring is still maintained, for example for 2 to 5 minutes, so as to obtain a perfectly homogeneous paste.

The paste thus prepared is then left to rest for at least one hour before being used.

It is obvious that other protocols for preparing pastes according to the invention may be implemented with an addition of the paste components in a different order from that mentioned above and/or with simultaneous addition of several components.

It is to be noted that the optional surfactant of the paste according to the invention favourably and significantly influences the rheological properties of the paste according to the invention. This surfactant especially avoids spreading or running risks during the treatment of vertical surfaces and ceilings.

The paste according to the invention thus prepared is then applied on the solid surface to be decontaminated of a substrate made of a solid material, in other words on the surface which has been exposed to contamination, for example biological contamination. This contamination has already been described above. In particular, the biological contamination may consist of one or more of the biological species already defined above.

As has been already indicated above, the active decontamination agent, for example the biological active decontamination agent, is selected according to the contaminant species, for example the biological species to be removed, eliminated, destroyed, or inactivated.

With the possible exception of alloys of light metals, such as aluminium, in the case where basic or acidic pastes are implemented, there is no limitation as to the material that constitutes the substrate to be decontaminated, indeed the paste according to the invention makes it possible to treat all kinds of materials, even fragile ones, without any damage.

The paste according to the invention generally does not generate any chemical, mechanical or physical deterioration, erosion, attack of the treated substrate.

However, in the case of sub-surface decontamination operations, the corrosion of the substrate is controlled over a few μm, as with suctionable gels.

The paste according to the invention is therefore in no way detrimental to the integrity of the treated substrates and even allows their reuse. Thus, sensitive materials such as military equipments are preserved and can be reused after their decontamination, while monuments treated with the paste according to the invention are not degraded at all and have their visual and structural integrity maintained.

This substrate material may therefore be selected from, for example, metals and alloys such as stainless steel, aluminium and lead; polymers such as plastic materials or rubbers, among which PVCs, PPs, PEs, especially HDPEs, PMMAs, PVDFs and PCs may be mentioned; glasses; cements and cementitious materials; mortars and concretes; plasters; bricks; natural or artificial stone; ceramics.

In all cases, whatever the material, the decontamination efficiency of the paste according to the invention is significant.

The treated surface may be painted or unpainted.

The efficiency of the treatment with the paste according to the invention is generally significant, including on substrates contaminated to a depth of several millimetres.

There are also no limitations as to the shape, geometry and size of the substrate and surface to be decontaminated, the paste according to the invention and the method implementing it allow the treatment of large surfaces with complex geometries, for example with hollows, angles and recesses.

The paste according to the invention ensures the effective treatment not only of substrates with horizontal surfaces such as floors, but also of substrates with vertical surfaces such as walls, or inclined or overhanging surfaces such as ceilings.

In comparison with decontamination methods, for example biological decontamination methods, which implement liquids such as solutions, the decontamination method according to the invention, implementing a paste, is particularly advantageous for the treatment of large-surface area, non-transportable materials and located outdoors. Indeed, the method according to the invention, because it uses a paste, allows in situ decontamination by avoiding the spreading of chemical solutions in the environment and the dispersion of contaminant species.

The paste according to the invention may be applied and spread on the surface to be treated by all the application methods known to the man skilled in the art.

Conventional methods are manual application, for example with a trowel, or application using a spraying machine in the manner of a mortar or coating.

The sufficiently short viscosity restoration, recovery time of the pastes according to the invention allows the applied pastes to adhere to all surfaces, for example to walls.

The amount of paste deposited onto the surface to be treated is generally 2,000 to 50,000 g/m$^2$, preferably 5,000 to 10,000 g/m$^2$. The amount of paste deposited per unit area and, accordingly, the thickness of the deposited paste influences the drying rate.

Thus, when a layer of paste with a thickness of 2 mm to 10 mm is deposited or sprayed on the surface of the substrate to be treated, the effective contact time between the paste and the materials is then equivalent to its drying time, period of time during which the active ingredient contained in the paste will interact with the contamination.

Further, it has been surprisingly shown that the amount of paste deposited—this paste further containing a specific viscosifier selected from clays—when it is within the ranges mentioned above and in particular when it is greater than or equal to 2,000 g/m$^2$ and especially in the range of 5,000 to 10,000 g/m$^2$, which corresponds to a minimum thickness of deposited paste, for example greater than or equal to 2,000 μm (2 mm) for an amount of deposited paste greater than or equal to 2,000 g/m$^2$, makes it possible, after drying of the paste, to obtain a dry and solid residue in the form of one or more large piece(s) (the size being defined by the largest dimension of the piece or pieces), each of the pieces having a size greater than or equal to 1 cm, preferably greater than or equal to 2 cm, and more preferably greater than or equal to 5 cm.

The amount of deposited paste, and therefore the thickness of deposited paste, preferably greater than or equal to 2,000 g/m$^2$ that is 2,000 μm, is, together with the specific nature of the viscosifier used in the paste according to the invention (see above), the fundamental parameter which influences the size of the dry residue formed after drying of the paste and which thus ensures that a dry and solid residue in the form of one or more large pieces, each of the pieces having a size greater than or equal to 1 cm, and not millimetre-sized dry residues or powdery residues, are formed. The dry and solid residue in the form of one or more large pieces obtained is easily removed by a mechanical method.

However, it is also to be noted that if the paste contains a surfactant at a low concentration, typically 0.1% to 2% of the total weight of the paste, then drying of the paste is improved and leads to an increased ability of the dry residues to be detached from the support.

The paste is then maintained on the surface to be treated for as long as it takes to dry. During this drying step, which can be considered as the active phase of the method according to the invention, the solvent contained in the paste, that is generally the water contained in the paste, evaporates until a dry and solid residue is obtained.

The drying time depends on the composition of the paste in the concentration ranges of its constituents given above, but also, as has been already set out, on the amount of paste deposited per unit area, that is the thickness of the deposited paste.

The drying time also depends on the weather conditions, that is the temperature and the relative humidity of the atmosphere in which the surface of the substrate made of a solid material is situated.

The method according to the invention may be carried out under extremely wide weather conditions, namely at a temperature T of 1° C. to 50° C. and a relative humidity RH of 20% to 80%.

The drying f time of the paste according to the invention is therefore generally 1 hour to 48 hours at a temperature T from 1° C. to 50° C. and a relative humidity RH from 20% to 80%.

It is to be noted that the formulation of the paste according to the invention especially when it contains surfactants such as "Pluronics®" generally ensures a drying time which is substantially equivalent to the contact time (between the decontamination agent, such as a biocidal agent, and the contaminant species, for example the biological, especially biotoxic species to be removed, eliminated) which is necessary, required to inactivate and/or absorb the contaminant species polluting the substrate material, and/or to sufficiently carry out surface erosion reactions of the material.

In other words, the formulation of the paste ensures a drying time which is no other than the inactivation time of the contaminant species, for example biological species, which is compatible with the inhibition kinetics of the contamination, for example biological contamination.

Or the formulation of the paste ensures a drying time which is no other than the time required for erosion reactions enabling a contaminated surface layer of the material to be removed.

In the case of radioactive contaminant species, the contamination is removed by dissolving the irradiating deposits or by corrosion of the contamination carrying materials. There is thus a real transfer of the nuclear contamination to the dry solid residue.

The surface area of the mineral filler generally used, which is generally from 50 m$^2$/g to 300 m$^2$/g, preferably 100 m$^2$/g, and the absorption capacity of the paste according to the invention make it possible to trap the labile (surface) and fixed contamination of the material constituting the surface to be treated.

If necessary, the contaminant species, for example the biological contaminant species, are inactivated in the pasty phase. After drying the paste, the contamination, for example the inactivated biological contamination, is removed upon recovering the dry paste residue described below.

At the end of drying of the paste, the dry paste forms a dry residue that fractures little or not at all in contrast to the dry residue of suctionable gels. This dry residue comprises one or more large size piece(s). The dry residue may contain the inactivated contaminant species.

The dry residue obtained at the end of drying of the paste has a low adhesion to the surface of the decontaminated material. Therefore, the dry residue obtained after drying the paste can be easily recovered by simple mechanical methods such as brushing. However, the dry residue may also be discharged by a gas jet, for example a compressed air jet.

Thus, no rinsing with a liquid is generally necessary, and the method according to the invention does not generate any secondary liquid effluent.

However, it is possible, although not preferred, and if desired, to remove the dry residue by means of a liquid jet.

The method according to the invention thus achieves, firstly, a significant saving in chemical reagents in comparison with a decontamination method by washing with a solution. Secondly, because a waste in the form of a dry residue is obtained that can be easily mechanically recovered, a rinsing operation with water or a liquid, which is generally necessary to remove traces of chemical agents from the part, is generally avoided. This obviously results in a reduction in the amount of effluents produced, but also in a significant simplification in terms of waste treatment and disposal.

Due to the predominantly mineral composition of the paste according to the invention and to the small amount of waste produced, the dry waste can be stored or directed to a discharge channel ("outlet") without prior treatment.

At the end of the method according to the invention, a solid waste is recovered in the form of one or more large size piece(s) of dry paste, which may be packaged as such, directly packaged, resulting, as already indicated above, in a significant reduction in the amount of effluents produced as well as in a significant simplification in terms of waste treatment channel and outlet.

Moreover, in the nuclear field, the fact that the solid dry residue does not have to be retreated before the waste is packaged is a considerable advantage; it allows the use of high performance active agents prohibited to date in decontamination liquids due to the operating constraints of the liquid effluent treatment plants (LETP).

The paste may therefore contain powerful oxidising agents such as cerium IV, which may very easily be regenerated from electrolysis of cerium III.

As an example, in the common case where 2,000 grams of paste are applied per $m^2$ of treated area, the dry waste weight produced is less than 1,400 grams per $m^2$.

EXAMPLES

Example 1

In this example, the preparation of two surface, subsurface and in depth, deep, decontamination pastes called "Paste-1", and "Paste-2" according to the invention is described.

Paste-1 is a paste with the following composition:

- 0.8% by weight (based on the total weight of the paste) of Cellulose BC 1000 (fibre size of about 700 μm) marketed by Arbocel®;
- 49.6% by weight (based on the total weight of the paste) of kaolinite marketed by Sigma-Aldrich®; and
- 49.6% by weight (based on the total weight of the paste) of deionised water.

Paste-2 is a paste with the following composition:

- 8% by weight (based on the total weight of the paste) of Cellulose BC 1000 (fibre size of about 700 μm) marketed by Arbocel®;
- 20% by weight (based on the total weight of the paste) of kaolinite marketed by Sigma-Aldrich®; and
- 72% by weight (based on the total weight of the paste) of deionised water.

The synthesis protocol is similar for both pastes:

- Deionised water is first weighed in an adapted container.
- Kaolinite and cellulose are then added progressively to the water under stirring using a three-blade mechanical stirrer, until a homogeneous mixture is obtained with no lumps.

The pastes thus formed are finally kept under stirring for a few minutes.

FIG. 1 is a photograph of the prepared Paste-1.

Figure 2:
FIG. 2 is a photograph of Paste-2 prepared in Example 1, in a container.

FIG. 2 is a photograph of the prepared Paste-2.

Each of the two pastes has a malleable structure that can be deposited onto a surface, such as a wall of a facility for example, manually or using a spraying machine, in the manner of a mortar or coating.

Example 2

In this example, the efficiency of a paste according to the invention, namely the Paste-1 prepared in Example 1, for surface, subsurface and in depth, deep, decontamination of a porous material is demonstrated.

More precisely, in this example, the decontamination of a porous material consisting of a stack of glass beads, which is deeply contaminated by $^{133}Cs$, is studied using a decontaminating paste according to the invention.

The decontaminating paste according to the invention used in this example is the Paste-1 prepared in Example 1.

The porous material used is a stack of glass beads, with sizes between 45 μm and 90 μm, which is prepared in a round crystallising dish with a diameter of 9.1 cm.

The stack of glass beads thus made, which is 2 cm high, is soaked and saturated with 43.42 mL of an aqueous $CsNO_3$ solution with a $CsNO_3$ concentration of 0.016 M. 93 mg of $^{133}Cs$ are present in the stack of glass beads.

A 2 cm layer of Paste-1 is then placed on the stack of glass beads saturated with the solution. The whole is then allowed to dry under ambient conditions. After one week of drying, the residual solid waste from the drying of the Paste-1 is separated from the stack of glass beads. The glass beads are then recovered and washed with a 0.1 M NaOH solution. The wash solution is finally analysed by atomic absorption spectroscopy in order to determine the amount of Cs remaining in the stack of glass beads, and thus to study the efficiency of the method. Analysis of the wash solution reveals the presence of 63.2 mg of Cs. The decontamination step thus allowed the recovery of 68% of the contaminants—that is $^{133}Cs$—present in the stack of glass beads.

The Paste-1 dried and absorbed the aqueous solution by capillary action. The contaminants—that is $^{133}Cs$—were thus absorbed from the porous material to the Paste-1 by advection.

By virtue of this example, it is clearly demonstrated that the "re-absorbent" pastes according to the invention have the capacity to decontaminate contaminated porous materials contaminated at the same time in surface, subsurface and in depth.

Example 3

In this example, the fixing of a contaminant in the final solid waste obtained after decontamination with a paste according to the invention is studied. It is demonstrated here that the clay is essential to both acts as a viscosifier and also as a contamination fixer. More precisely, in this example, the ability of the pastes according to the invention to fix a contaminant within the dry paste obtained after a decontamination operation is demonstrated.

For this, 1 g of kaolinite marketed by Sigma-Aldrich® has been soaked with 4 mL of a Cs solution. Different samples were made with different Cs concentrations, namely: $10^{-1}$M, $10^{-2}$M, $10^{-3}$M, and $10^{-5}$M. The samples have been allowed to dry until evaporation and then suspended in 100 mL under stirring for 24 h. After these 24 h, the solution has been filtered and the Cs content has been analysed by atomic absorption spectroscopy and then compared to the amount of Cs introduced into the gram of kaolinite. The Cs content retained by the clays has finally been calculated and expressed in %. The results are gathered in Table 1 below.

TABLE 1

| Cs retention by clay (kaolinite) | | |
|---|---|---|
| Cs concentration of the soaking solution | $m_{Cs}$ in $H_2O$ after suspending | % Cs retention by the clay |
| $10^{-1}$M | $4.4.10^{-2}$ g | 13% |
| $10^{-2}$M | $3.97.10^{-3}$ g | 22% |
| $10^{-3}$M | $2.84.10^{-4}$ g | 47% |
| $10^{-5}$M | Below the detection limit of the apparatus | ≈100% |

The percent of Cs retained by the clay depends on the initial amount of Cs added, which may be explained by saturation of the fixing sites.

The test carried out with a Cs concentration of $10^{-5}$ M may be considered as the most representative of nuclear contamination because of the small amount of contaminant present. In this case, it is observed that almost all the contaminants (that is Cs) can be fixed by the clay.

In conclusion, in the case of a paste used for a Cs decontamination operation, the clay proves to be indispensable to act both as a viscosifier and a contamination fixer.

Example 4

In this example, it is demonstrated that the pastes according to the invention can hold on a vertical wall even if they are applied with a significant thickness, by virtue of the presence of a compound in the form of fibres.

Two new pastes have then been prepared (according to the same protocol as described in example 1):

a "Paste-3", not in accordance with the invention, the composition of the which is as follows: 50% by weight of kaolinite marketed by Sigma-Aldrich, and 50% by weight of deionised water.

a "Paste-4", according to the invention, the composition of which is as follows: 2.4% by weight of Cellulose BC 1000 marketed by Arbocel®; 48.8% by weight of kaolinite marketed by Sigma-Aldrich; and 48.8% by weight of deionised water.

Figures 3A, 3B, 3C:
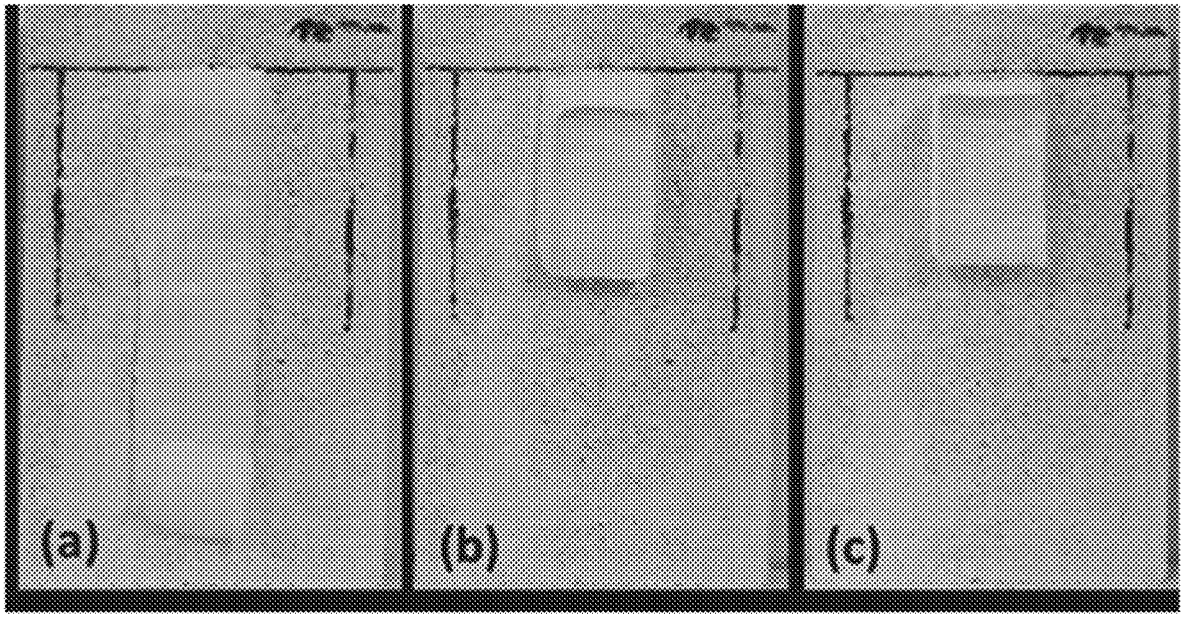
FIGS. 3A, 3B, and 3C are photographs showing a layer, deposit, of Paste-3 (FIG. 3A), a layer, deposit, of Paste-1 (FIG. 3B), and a layer, deposit, of Paste-4 (FIG. 3C) which are deposited onto a vertical mortar wall surface. The thickness of the paste layers deposited is 10 mm.

FIGS. 3A, 3B, and 3C show a layer, deposit, of Paste-3 (FIG. 3A), a layer, deposit, of Paste-1 (described in Example 1) (FIG. 3B) and a layer, deposit, of Paste-4 (FIG. 3C) deposited onto a vertical wall surface made of mortar. The thickness of the deposited layers of paste is 10 mm.

It is observed in FIGS. 3A, 3B, and 3C, that in the absence of cellulose fibres, the paste (in this case Paste-3, not in accordance with the invention) does not hold on a vertical surface with a large thickness. The addition of cellulose fibres in small amounts (Paste-1 and Paste-4 according to the invention) enables the paste to hold on a vertical wall, even when a large thickness of paste, especially of at least 10 mm, is deposited.

Moreover, at the end of drying of Paste-1 and Paste-4, according to the invention, a non-powdery solid waste with a similar size to that which has been deposited is obtained and no fracture is observed in this solid waste.

In other words, the non-powdery solid waste has the same centimetre size as the wet paste deposit, which demonstrates that the presence of fibres does not negatively impact the size of the final waste.

REFERENCES

[1] US-A1-2012/0121459
[2] WO-A2-2007/039598
[3] WO-A2-2004/008463
[4] EP-A2-0642846
[5] WO-A1-2010/037809
[6] U.S. Pat. No. 7,737,320
[7] FR-A1-2 967 422

What is claimed is:

1. A decontamination paste consisting of:

at least one inorganic viscosifier selected from clays, said inorganic viscosifier representing from 20% to 70% by weight of the total weight of the paste, and said inorganic viscosifier being in the form of micron- and/or nano-sized particles;

at least one compound in the form of fibres that have a diameter from 2 μm to 10 μm and a length from 50 μm to 10 mm;

optionally, furthermore, one or more component(s) selected from the following components:

at least one non-ionic surfactant selected from ethylene oxide and propylene oxide block copolymers and ethoxylated fatty acids;

at least one active decontamination agent selected from the group consisting of sodium hydroxide, potassium hydroxide, nitric acid, phosphoric acid, hydrochloric acid, sulphuric acid, hydrogen oxalates, peroxides, permanganates, persulphates, ozone, hypochlorites, cerium IV salts, hexadecylpyridinium salts, reducing agents; and mixtures thereof;

at least one contaminant species extracting agent selected from the group consisting of zeolites, clays, phosphates, titanates, ferrocyanides and ferricyanides;

at least one contaminant species chelating agent selected from the group consisting of n-octylphenyl-N,N-diisobutylcarbamoyl methylphosphine oxide (CMPO), tributyl phosphate (TBP), 1-hydroxyethane-1,1-disphosphinic acid (HEDPA), di-2-ethylhexylphosphoric acid (DHEPA), trioctylphosphine oxide (TOPO), diethylenetriamine pentaacetate (DTPA), primary, secondary and tertiary organic amines, cobalt dicarbollide, calixarenes, niobates, ammonium molybdophosphate (AMP), (trimethylpentyl) phosphinic acid (TPPA), and mixtures thereof;

at least one colouring agent selected from organic dyes and mineral pigments;

and the balance of solvent selected from water, organic solvents and mixtures thereof, wherein said decontamination paste has a viscosity greater than or equal to 100 Pa·s at 20° C. for a shear rate of less than 1 $s^{-1}$.

2. The decontamination paste according to claim 1, wherein said component(s) is (are) present in the following proportions:

0.1 to 10% by weight based on the weight of the paste, of the at least one compound in the form of fibres;

optionally, 0.1 to 2% by weight, based on the weight of the paste, of the at least one non-ionic surfactant;

optionally, 0.1 to 10 mol/L of paste, of the at least one active decontamination agent;

optionally, 0.1% to 5% by weight, based on the weight of the paste, of the at least one contaminant species extracting agent;

optionally, from 0.1% to 5% by weight, based on the weight of the paste, of the at least one contaminant species chelating agent;

optionally 0.01% to 10% by weight, based on the weight of the paste, of the at least one colouring agent;

and the balance of solvent.

3. The decontamination paste according to claim 1, wherein the fibres are selected from the fibres of organic compounds, and fibres of mineral compounds.

4. The paste according to claim 1, wherein the non-ionic surfactant is selected from ethylene oxide and propylene oxide block copolymers and mixtures thereof.

5. The paste according to claim 1, wherein the colouring agent is selected from the group consisting of metal(s) and/or metalloid(s) oxides, metal(s) and/or metalloid(s) hydroxides, metal(s) and/or metalloid(s) oxyhydroxides, metal(s) ferrocyanides and ferricyanides, metal(s) aluminates, and mixtures thereof.

6. The paste according to claim 1 which is supersaturated with solvent.

7. A method for decontaminating a substrate made of a solid material, said substrate being contaminated by at least one contaminant species called a labile contaminant species and/or by at least one contaminant species called a surface contaminant species located on one of its surfaces, and/or by at least one contaminant species called a subsurface contaminant species located just below said surface, and/or by at least one contaminant species located below said surface in the depth of the substrate, wherein at least one cycle is carried out, comprising the following successive steps of:

a) applying the paste according to claim 1 on said surface;

b) maintaining the paste on the surface at least for a sufficient time for the paste to destroy and/or inactivate and/or absorb and/or solubilise the contaminant species, and for the paste to dry and form a dry and solid residue containing said contaminant species;

c) removing the dry and solid residue containing said contaminant species.

8. The method according to claim 7, wherein the substrate is a porous substrate.

9. The method according to claim 7, wherein the solid material is selected from the group consisting of metals and metal alloys; glasses; cements and cementitious materials; mortars and concretes; plasters; bricks; natural or artificial stone; ceramics.

10. The method according to claim 7, wherein the contaminant species is selected from chemical, biological, nuclear or radioactive contaminant species.

11. The method according to claim 10, wherein the contaminant species is a biological species selected from bacteria, fungi, yeasts, viruses, toxins, spores, prions, and protozoa.

12. The method according claim 7, wherein the paste is applied on the surface in an amount of 2,000 g to 50,000 g of paste per $m^2$ of surface.

13. The method according to claim 7, wherein during step b), drying is carried out at a temperature of 1° C. to 50° C., and under a relative humidity of 20% to 80%.

14. The method according to claim 7, wherein the paste is maintained on the surface for a period of 2 to 72 hours.

15. The method according claim 7, wherein the dry and solid residue is in the form of one or more piece(s), each of said pieces having a size greater than or equal to 1 cm.

16. The method according claim 7, wherein the dry solid residue is removed from the solid surface by a mechanical process.

17. The method according to claim 7, wherein the cycle described is repeated 1 to 10 times by using the same paste in all cycles or by using different pastes in one or more cycle(s).

18. The method according to claim 7, wherein the paste applied during step a) is a paste supersaturated with solvent.

* * * * *